United States Patent [19]

Raidel

[11] 4,131,297
[45] Dec. 26, 1978

[54] DOUBLE AXLE SUSPENSION

[76] Inventor: John E. Raidel, Rte. 9, Box 400-M, Springfield, Mo. 65804

[21] Appl. No.: 728,868

[22] Filed: Oct. 1, 1976

[51] Int. Cl.$^2$ .............................................. B60G 5/04
[52] U.S. Cl. ...................................................... 280/682
[58] Field of Search .................... 280/104.5, 682, 104

[56] References Cited

U.S. PATENT DOCUMENTS

| | | | |
|---|---|---|---|
| 3,499,660 | 3/1970 | Raidel | 280/682 |
| 3,602,523 | 8/1971 | Poulos | 280/682 |
| 3,614,123 | 10/1971 | Raidel | 280/682 |
| 3,738,631 | 6/1973 | Haley | 280/682 |

*Primary Examiner*—Richard A. Bertsch
*Attorney, Agent, or Firm*—Rogers, Eilers & Howell

[57] ABSTRACT

A suspension assembly for a vehicle having front and rear axles. Front and rear hanger assemblies depending from the vehicle chassis. A free floating shackle assembly between the axles. A front leaf spring extending between the front hanger assembly and the shackle assembly and bearing downwardly on the front axle. A rear leaf spring extending between the shackle assembly and the rear axle and bearing upwardly against an elastomer main load pad in the rear hanger assembly. The rear leaf spring bears downwardly against the rear axle. Elastomeric load pad spacers are used to mount the leaf springs. A slide limiter mounted to an end of the rear leaf spring allows linear sliding within specified limits while retaining the leaf spring in a downwardly bearing relationship to the rear axle.

25 Claims, 8 Drawing Figures

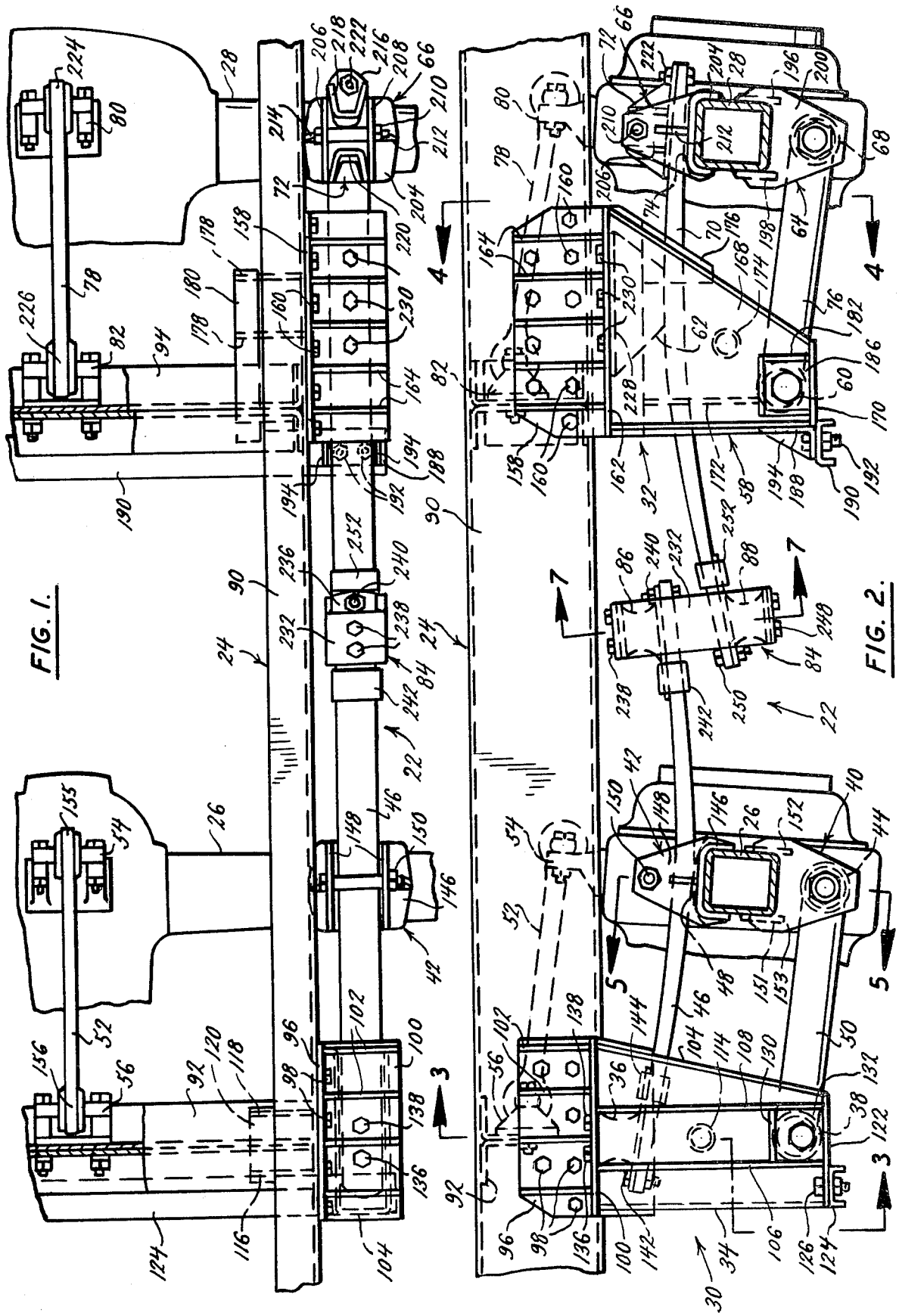

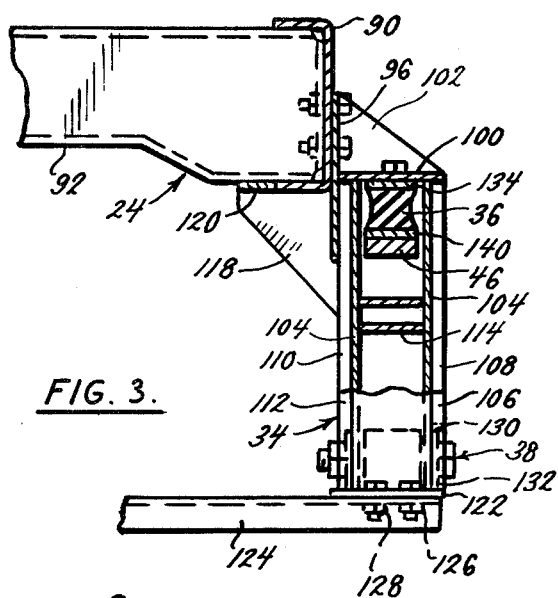
FIG. 3.
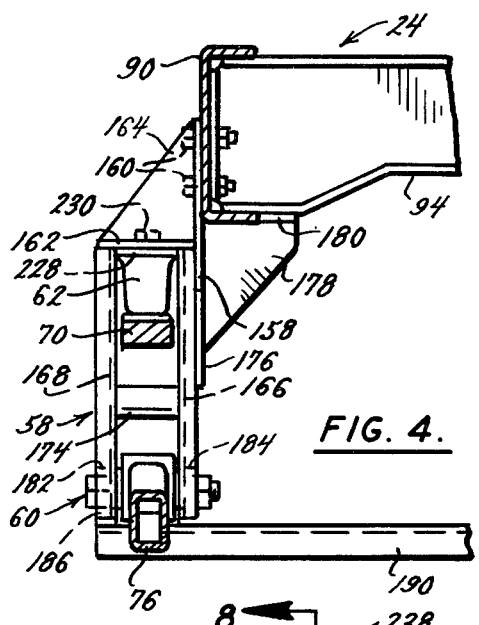
FIG. 4.
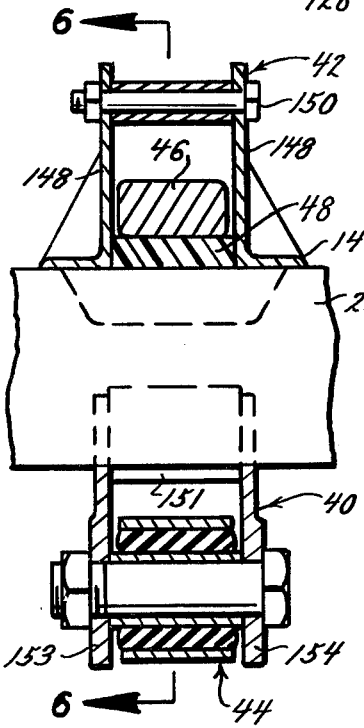
FIG. 5.
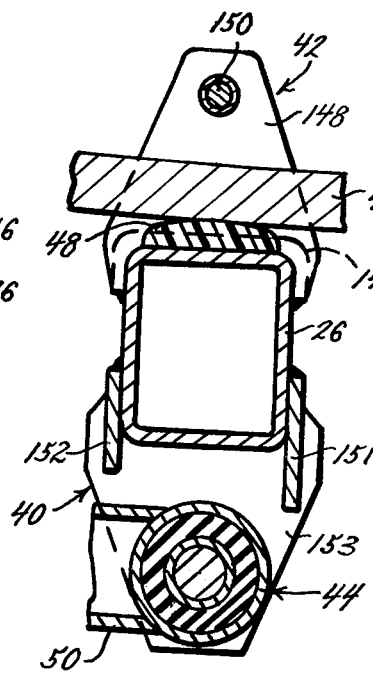
FIG. 6.
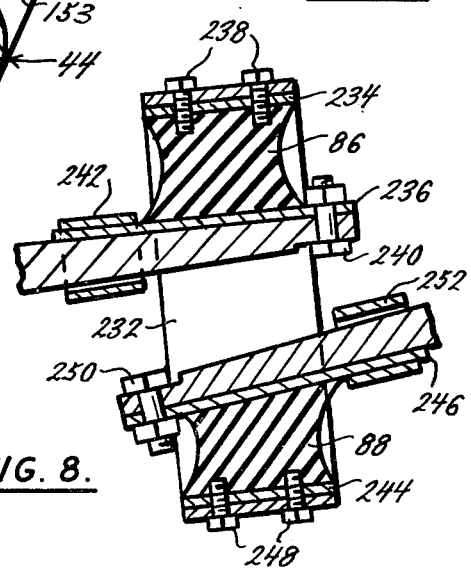
FIG. 7.
FIG. 8.

DOUBLE AXLE SUSPENSION

BACKGROUND AND SUMMARY OF THE INVENTION

Suspension systems for vehicles with two or more axles are widely known from the prior art. In fact, the applicant has been the inventor of several suspension systems including that disclosed in U.S. Patent No. 3,614,123 issued Oct. 19, 1971, and incorporated herein by reference.

However, the present invention possesses substantial improvements over those of the prior art. Applicant's design utilizes elastomer load pad spacers to mount the leaf spring to the supporting members of the suspension assembly. Load pads are added to provide additional deflection for the stiffer single leaf springs, serve as load bearings for the required geometric axle articulation, dampen road shocks, and reduce vibration frequencies of free floating leaf springs. In this manner, applicant succeeds in eliminating several bushing assemblies that are required in other designs. As the elastomer load pads are easily clamped and bolted to the ends of the leaf springs, there is no requirement that the ends of the leaf springs be either journaled around a bushing or looped around retaining bolts. By eliminating this extra forming at the ends of the leaf springs, a single thicker spring can be used with adjacent deflection means instead of the multilayered spring previously required.

Furthermore, applicant's design is much less prone to damage because of the simplistic shape of the leaf springs themselves. The journaled or looped ends as used on previous designs are difficult to form correctly and also subject to breakage and misalignment during use. Once a journaled or looped end of a spring is damaged the whole spring must be replaced. However, with the use of elastomeric load pads, failure of only the spring or load pad does not require the replacement of both.

The applicant has also added urethane wear pads to the spring guides on the axles to eliminate metal-to-metal wear during operation.

Other advantages to applicant's design include decreased cost and ease of construction over previous designs because of its simplified leaf spring assemblies and hanger assemblies and the elimination of several bushing assemblies. Maintenance and possible trouble areas are also decreased to a minimum. Additionally, the present invention utilizes the combined flexing of the leaf springs and cooperating elastomers in a unique way to provide an exceptionally stable, yet comfortable ride.

These and other advantages are apparent from the drawing and detailed description to follow.

BRIEF DESCRIPTION OF THE INVENTION

This suspension assembly is for a vehicle that has front and rear axles. A front hanger assembly projects downwardly from the vehicle chassis forward of the front axle and a rear hanger assembly projects downwardly from the vehicle chassis forward of the rear axle. A front leaf spring is flexibly suspended by means of elastomeric pads from the front hanger assembly and flexibly attached to a free floating shackle assembly. The center of the front leaf spring bears downwardly against the front axle. A rear leaf spring is flexibly mounted to the free floating shackle assembly by means of an elastomeric pad and, at its rear end, bears downwardly against the rear axle by means of a mounting bracket providing limited fore and aft movement of the rear end of the spring. The center of the rear leaf spring bears upwardly against an elastomeric bumper or pad that is bolted to the rear hanger assembly.

A radius or torque rod is connected between the front axle and the front hanger assembly. Similarly, a radius or torque rod is connected between the rear axle and the rear hanger assembly. A radius rod is pivotally connected between the chassis and a bracket that is affixed to the center of the front axle, and a radius rod is pivotally connected to the chassis and a bracket affixed to the center of the rear axle. The radius rods are substantially parallel to the torque rods to minimize axle rotation and form a geometrical parallelogram.

The torque rods are mounted by means of rubber bushing assemblies. The rubber bushings used to mount the front ends of the torque rods contain eccentric cams or other means like conventional radius rods with screw type adjustment means that can be adjusted for axle alignment.

BRIEF DESCRIPTION OF THE DRAWINGS

FIG. 1 is a top plan view of a double axle suspension assembly of this invention;

FIG. 2 is a side elevation view of the suspension assembly of FIG. 1;

FIG. 3 is a view in section taken along the line 3—3 of FIG. 2 detailing the front hanger assembly;

FIG. 4 is a view in section taken along the line 4—4 of FIG. 2 detailing the rear hanger assembly;

FIG. 5 is a view in section taken along the line 5—5 of FIG. 2 detailing the front axle mounting;

FIG. 6 is taken along the line 6—6 of FIG. 5 detailing the side view of the front axle mounting assembly;

FIG. 7 is a view in section taken along the line 7—7 of FIG. 2 and detailing the free floating shackle assembly; and FIG. 8 is taken along the line 8—8 of FIG. 7 and details the side view of the free floating shackle assembly.

DETAILED DESCRIPTION OF A PREFERRED EMBODIMENT

This suspension assembly 22 is designed for installation between the chassis 24 of a vehicle and its front and rear axles 26 and 28. Although a suspension 22 for one side of the vehicle is shown, an identical suspension assembly would be installed on the opposite side of the vehicle. The suspension assembly 22 includes a front axle subassembly 30 and a rear axle subassembly 32. As will be described in more detail hereinafter, the front axle subassembly 30 has a hanger assembly 34 that is connected to and depends below the vehicle chassis 24. The hanger assembly 34 supports a flexible elastomer load pad spacer 36 and a bushing assembly 38. An axle seat 40 is welded to the underside of the front axle 26, and a spring guide 42 is welded to the upper side of the front axle 26. The axle seat 40 supports a bushing assembly 44 below the front axle 26.

A leaf spring 46 is slidable in the spring guide 42 and bears down against a urethane wear pad 48 covering the top of the axle 26. A torque rod 50 is connected between the bushing assembly 38 on the hanger assembly 34 and the bushing assembly 44 on the lower end of the axle seat 40.

At the center of the front axle 26, a radius rod 52 has pivoted end connections to an axle bracket 54 that is welded to the upper side of the front axle 26 and a chassis bracket 56 that is mounted to the chassis 24. The radius rod 52 is substantially parallel to the torque rod 50.

The rear axle subassembly 32 has a hanger assembly 58 that is connected to and depends below the chassis 24. The hanger assembly 58 supports a bushing assembly 60 and an elastomeric bumper or pad 62. An axle seat 64 is welded to the underside of the rear axle 28, and a spring guide 66 is welded to the upper side of the rear axle 28. The axle seat 64 supports a bushing assembly 68 below the rear axle 28.

A leaf spring 70 bears upwardly against the elastomeric pad 62 near the center of the leaf spring 70. A limiter 72 is bolted to the rear of the leaf spring 70 and straddles the spring guide 66. The leaf spring 70 bears downwardly against a urethane wear pad 74 covering the top of the axle 28. A torque rod 76 is connected between the bushing assembly 60 and the bushing assembly 68. A radius rod 78 has pivoted end connections to an axle bracket 80 that is welded to the upper side of the rear axle 28, and a chassis bracket 82 that is mounted to the vehicle chassis 24. The radius rod 78 is substantially parallel to the torque rod 76.

A shackle assembly 84 supports vertically spaced elastomeric load pad spacers 86 and 88. The rear end of the front leaf spring 46 is bolted to the elastomeric load pad 86 and the front end of the rear leaf spring 70 is bolted to the elastomeric load pad 88.

The foregoing general components of this suspension assembly 22 will now be described in more detail. Referring to FIGS. 1 and 2, the suspension system 22 is supported from a vehicle chassis 24. The chassis 24 includes (on the side shown) a side rail 90 and cross beams 92 and 94.

In the front subassembly 30, the hanger assembly 34 comprises a gusset plate 96 fastened to the side frame member 90 by a plurality of bolts 98. As shown in FIG. 3, a horizontal plate 100 is welded to the gusset plate 96 and reinforcing webs 102 are welded to the gusset plate 96 and horizontal plate 100.

A downwardly extending U-shaped bracket 104 is welded to the horizontal plate 100 and has vertical flanges 106 and 108 on the outboard side and vertical flanges 110 and 112 on the inboard side. A reinforcing rod 114 separates the legs of the U-bracket 104. Two reinforcing webs 116 and 118 are welded to the gusset plate 96 and a mounting strip 120 which is in turn welded to cross beam 92. A bottom plate 122 is welded to the bottom of the U-bracket 104. A connecting bracket 124 is bolted to the bottom plate 122 with bolts 126 and 128 and extends to the other suspension assembly on the opposite side of the vehicle chassis 24. A bracket 130 connects vertical flanges 106 and 108 and forms a square opening to accept a clamp assembly 132 for the bushing assembly 38.

The elastomeric load pad 36 is bonded at each end to a metal plate for mounting. The top plate 134 is mounted to the horizontal plate 100 by means of two bolts 136 and 138. A bottom plate 140 is used to secure the front of the leaf spring 46 by means of a bolt 142 and a clamp 144.

The central portion of the leaf spring 46 rests against the urethane wear pad 48 at the base 146 of the spring guide 42. Spring guide 42 is welded to the front axle 26 and has upwardly extending sides 148 with a bolt 150 extending between them and spaced above the leaf spring 46. The sides 148 and bolt 150 provide lateral and upper limits to movements of the leaf spring 46, but do not interfere with longitudinal sliding movement of the leaf spring 46 across the urethane wear pad 48 of the spring guide 42.

The bushing assembly 38 that is mounted in the hanger assembly 34 extends between the two arms of the U-bracket 104 and secures the torque rod 50 to the front hanger assembly 34. The bushing assembly 38 has a cam, or eccentric bolt, for axle alignment and may be of the type shown by item 68 in U.S. Pat. No. 3,801,086, incorporated herein by reference. The other end of the torque rod 50 is secured to the axle seat 40 by the bushing assembly 44 which may be of the type shown by item 108 in U.S. Pat. No. 3,801,086.

The axle seat 40 consists of two flaps 151 and 152 which are welded to the front axle and extend downwardly therefrom. Two triangular side plates 153 and 154 are welded to flaps 151 and 152 and are shaped to fit the bottom of the front axle 26. The bushing assembly 40 is mounted between the plates 153 and 154.

The rear end 155 of the front radius rod 52 is pivotally connected to the axle bracket 54. The front end 156 of the radius rod 52 is pivotally connected to the chassis bracket 56 that is mounted to one of the chassis cross members 92.

The hanger assembly 34 positions the elastomer load pad 36 and the bushing assembly 38 generally in a vertical line below the chassis bracket 56. Another line is formed by the bushing assembly 44, the axle 26, and the axle bracket 54 which is approximately 4° clockwise away from vertical. These substantially parallel vertical lines combine with the torque or radius rod 50 and the rod 52 to substantially define a parallelogram that restricts axle rotation.

In the rear subassembly 32, the hanger assembly 58 comprises a gusset plate 158 fastened to the side rail 90 by a plurality of bolts 160. A horizontal plate 162 is welded to the vertical gusset plate 158. Reinforcing webs 164 are welded to the gusset plate 158 and horizontal plate 162. Two downwardly extending U-brackets 166 and 168 oppose one another and are welded to the horizontal plate 162. These U-brackets 166 and 168 narrow in length from their tops to their bottoms where an end bracket 170 is welded and connects them for strength. A curved side bracket 172 is welded to the front edge of the inboard U-bracket 166 and extends from the bottom of the gusset plate 158 to the top of the bushing assembly 60. A Reinforcing rod 174 is welded to the U-brackets 166 and 168. A triangular reinforcing plate 176 is welded from the bottom rear of the gusset plate 158 to the inboard U-bracket 166. Reinforcing webs 178 are welded between the gusset plate 158 and a mounting strip 180 which is welded to the crossbeam 94. Three bushing brackets 182 on the outboard side and three bushing brackets 184 on the inboard side are welded to their respective U-bracket 166 and 168 at the bottom and provide support for a clamp assembly 186 for bushing 60. The bushing assembly 60 is identical to the bushing assembly 38.

An L-bracket 188 is welded to the front edges of the U-brackets 166 and 168 and provides the mounting location for a connecting bracket 190 which is mounted by two bolts 192. Reinforcing webs 194 are welded between the legs of the L-bracket 188 for additional strength. The connecting bracket 190 extends from the rear hanger assembly 58 to the opposing hanger assembly (not shown) for the other side of the rear axle 28.

The bushing assembly 60 that is mounted in the hanger assembly 58 extends between the two U-brackets 166 and 168 and secures the rod 76 to the rear hanger assembly 58. The other end of the rod 76 is secured to the axle seat 64 by bushing assembly 68 which is identical to bushing assembly 44.

The axle seat 64 consists of two flaps 196 and 198 which are welded to the rear axle 28 and extend downwardly therefrom. Two triangular side plates 200 are welded to flaps 196 and 198 and are shaped to fit to the bottom of the rear axle 28. The bushing assembly 68 is mounted between the plates 200.

The rear spring guide 66 consists of a U-bracket 204 which fits over the top of the rear axle 28 and is welded to the rear axle 28. The urethane wear pad 74 is located at the base of the U-bracket 204 and covers the top of the axle so that the rear leaf spring 70 rides thereon. Upwardly extending triangular plates 206 and 208 are welded to the U-bracket 204, and are connected at their tops by a bolt assembly 210. Reinforcing webs 212 and 214 are welded between the triangular plates 206 and 208 and the U-bracket 204. A limiter 72 is mounted through the top of the rear end of the rear leaf spring 70 and consists of a base plate 16 and two ear pieces 218 and 220 welded to the base plate on opposite sides of the bolt assembly 210. The base plate 216 is bolted to the leaf spring 70 by a bolt 222.

The rear end 224 of the rod 78 is pivotally connected to the axle bracket 80. The front 226 of the rod 78 is pivotally connected to the chassis bracket 82 that is mounted to one of the chassis cross members 94.

The elastomeric pad or bumper 62 is bonded to a metal mounting plate 228 and is bolted to the horizontal plate 162 by a plurality of bolts 230.

The hanger assembly 58 positions the bushing assembly 60 generally in a vertical line below the chassis bracket 82, which is substantially parallel to the generally vertical line defined by the bracket 80, the rear axle 28, and the bushing assembly 68. These substantially parallel vertical lines combine with the substantially parallel rod 76 and rod 78 to define an approximate parallelogram that restricts rear axle 28 rotation.

As shown in FIGS. 7 and 8, the shackle assembly 84 is comprised of a rectangular bracket 232 which almost completely surrounds the elastomeric load pads 86 and 88. Elastomeric pad 86 is bonded to a top plate 234 and a bottom plate 236. A plurality of bolts 238 are used to mount the top metal plate 234 to the top of the shackle assembly 84. The bottom plate 236 is used to mount the elastomeric pad to the rear of the front spring 46 by a bolt 240 and a clamp 242. The bottom elastomeric pad 88 similarly has a bottom plate 244 and a top plate 246 for mounting. A plurality of bolts 248 are used to mount the bottom plate 244 to the shackle assembly 84. The top plate 246 is used to mount the elastomeric pad 88 to the rear leaf spring 70 by a bolt 250 and a clamp 252.

OPERATION

In the suspension assembly 22, excessive loads applied to either axle 26 or 28 are partially distributed to the other axle. For example, if an excessive load is applied upwardly to the axle 26, the excessive load is resisted by the leaf spring 46. In addition, the excessive load tends to swing the leaf spring 46 upwardly about the elastomer load pad 36 applying an upward pressure to the shackle assembly 84. This upward pressure is transmitted by the shackle assembly 84 to the front of the leaf spring 70 through the elastomeric pad 86 and 88, tending to swing the leaf spring 70 about the elastomer bumper or pad 62 which thereby exerts a downward force on the rear end of the leaf spring 70 against the rear axle 28. Since the rear axle 28 is held relatively stationary in comparison to the chassis 24 by the tire (not shown) resting on the ground, the force transmitted to this leaf spring 70 tends to flex it and thereby load the rear axle 28 by allowing it to move upward towards the chassis 24.

This upward motion of the rear axle 28 as a result of the loading placed on the front axle 26 depends upon the shifting and flexing of the leaf springs 46 and 70 about their flexible mounting points, as well as some sliding against the load bearing urethane pads 48 and 74 and the elastomer bumper 62. The spring guides 42 and 66 insure that the leaf springs 46 and 70 shift in a general fore and aft motion and not laterally to the suspension assembly 22. The limiter 72 restricts the maximum amount of linear movement of the rear spring in the suspension assembly 22 which eliminates the possibility of the rear leaf spring 70 slipping off the rear axle 28. The bolts 150 and 210 act as vertical limiters to retain the springs 46 and 70 in the guides 42 and 66. Additionally, the elastomeric load pads 36, 86, and 88 provide not only compressive resilience but also resilient flexing in the fore and aft directions, and cooperate with the bumper 62 to provide an exceptionally stable and comfortable ride.

The aforementioned substantial parallelogram design helps to minimize any possible axle rotation during the flexing and transmitting of a load from one axle to another. The eccentric bushings 38 and 60 permit axle alignment of the suspension assemblies 22.

Various changes and modifications may be made in this invention, as will be readily apparent to those skilled in the art. Such changes and modifications are within the scope and teaching of this invention as defined by the claims appended hereto.

What is claimed is:

1. A vehicle suspension assembly for a vehicle having a chassis and front and rear axles comprising front and rear hanger assemblies depending from the vehicle chassis, a shackle assembly, a front leaf spring extending between the front hanger assembly and the shackle assembly, a rear leaf spring extending between the rear axle and the shackle assembly, means flexibly mounting the front spring to the front hanger assembly, means flexibly mounting the front and rear spring to the shackle assembly, all of said flexible mounting means permitting longitudinal deflection of the springs with respect to its associated mounting, the front leaf spring having a part between the front hanger assembly and the shackle assembly bearing downwardly against the front axle, a spring guide between the front axle and the part of the front leaf spring bearing thereon to permit relative longitudinal sliding movement between the front leaf spring and the front axle, and a load pad means supported by the rear hanger assembly, the rear leaf spring having an area between the rear axle and the shackle assembly bearing upwardly against the load pad means.

2. The device of claim 1 including means on the rear end of the rear leaf spring limiting the longitudinal shifting of the rear spring in both the fore and aft directions.

3. The device of claim 1 including wear pads in the spring guide covering the load bearing areas contacting the springs.

4. The device of claim 1 including a first rod pivotally connected between the front hanger assembly and the front axle, and a second rod pivotally connected between the rear hanger assembly and the rear axle.

5. The device of claim 4 including a third rod pivotally connected between the front axle and the chassis, and a fourth rod pivotally connected between the rear axle and the chassis.

6. The device of claim 1 wherein said load pad means is an elastomeric pad.

7. The device of claim 1 including means restricting the vertical movement of the leaf springs.

8. The device of claim 5 wherein eccentric bushings connect each of said first and second rods to its respective hanger assembly.

9. The device of claim 1 wherein the flexible mounting means comprises elastomer spacers.

10. A vehicle suspension assembly for a vehicle with a chassis and front and rear axles comprising front and rear leaf springs bearing downwardly upon said axles, a free floating shackle assembly, and flexible elastomer spacers connecting an end of each leaf spring to said shackle assembly to thereby permit longitudinal deflection of said springs with respect to each other and said shackle assembly to allow the distribution of loading from one spring to another.

11. The device of claim 10 further comprising an elastomer spacer connecting an end of the front leaf spring to the chassis.

12. The device of claim 10 further comprising a spring guide mounted on the rear axle, said spring guide having means to retain an end of the rear leaf spring in a downwardly bearing relationship to said rear axle.

13. The device of claim 12 wherein the retaining means limits longitudinal movement of said rear spring with respect to the rear axle.

14. The device of claim 12 further comprising front and rear hanger assemblies depending from the chassis and a flexible elastomer spacer connecting the front leaf spring to said hanger.

15. The device of claim 14 further comprising a first front rod pivotally connected between the front axle and the front hanger, and a first rear rod pivotally connected between the rear axle and the rear hanger.

16. The device of claim 15 further comprising a second front rod connected between the front axle and the chassis and a second rear rod connected between the rear axle and the chassis.

17. A vehicle suspension assembly for a vehicle having a chassis and front and rear axles comprising front and rear hanger assemblies depending from the vehicle chassis, a free floating shackle assembly between the hanger assemblies, a front leaf spring extending between the front hanger assembly and the shackle, a front spring guide mounted to the top of the front axle, said spring guide having means to limit the vertical motion of the front leaf spring, a wear pad in said spring guide, the front leaf spring bearing downwardly on said wear pad, an elastomeric spacer connecting the forward end of the front leaf spring to the front hanger assembly and an elastomeric spacer connecting the rear end of the front leaf spring to the shackle assembly, a rear leaf spring extending between the rear axle and the shackle assembly, load pad means depending from the rear hanger assembly, a portion of the rear leaf spring between its ends bearing upwardly against said load pad, an elastomeric spacer connecting the forward end of the rear leaf spring to the shackle assembly, a rear spring guide mounted to the top of the rear axle, a wear pad in said spring guide, the rear end of the rear leaf spring bearing downwardly on said wear pad, said spring guide having means to limit the vertical motion of the rear leaf spring, means limiting the longitudinal movement of the rear leaf spring in the rear spring guide, a front axle seat mounted to the front axle, said axle seat containing a bushing, the front hanger assembly containing a bushing, a first front rod extending between said bushings in the front hanger assembly and in the front axle seat, a rear axle seat mounted to the rear axle, said axle seat containing a bushing, the rear hanger assembly containing a bushing, a first rear rod extending between said bushings in the rear hanger assembly and in the rear axle seat, a second front rod pivotally connected between the front axle and the chassis, and a second rear rod pivotally connected between the rear axle and the chassis, said first and second front rods being substantially parallel to each other, and said first and second rear rods being substantially parallel to each other.

18. The device of claim 17 wherein the load pad means is elastomeric.

19. The device of claim 17 wherein said rear spring guide and means limiting the longitudinal movement of the rear leaf spring further comprise a bracket secured to the rear end of the rear leaf spring and having fore and aft spaced ear members extending vertically therefrom, and stop means associated with the rear spring guide between said ear members for engagement therewith to limit fore and aft movement of said rear spring relative to said rear axle.

20. In a suspension assembly for a vehicle having a chassis and axle and including at least one leaf spring, a device for resiliently securing an end of the leaf spring to a component of the suspension assembly, said device comprising an elastomeric spacer, means for mounting an end of the leaf spring to one side of the elastomeric spacer, and means for mounting the other side of the spacer to the component of the suspension assembly to which the end of the spring is to be mounted, said spacer providing both compressive resilience and resilient flexing in the fore and aft directions upon loading and unloading the suspension assembly.

21. In a vehicle suspension assembly for a vehicle having a chassis, an axle, and at least one leaf spring extending fore and aft, a device for mounting an end of said leaf spring to bear against said axle, said device comprising a spring guide mounted to the side of the axle against which the end of the spring bears, said guide having plates extending from said axle and between which the end of the spring extends to confine the end of the spring transversely, stop means mounted to said plates for limiting the vertical movement of the end of said spring, a base mounted to said spring opposite the side bearing against the axle, said base having ears extending therefrom and spaced fore and aft of said stop member, the spacing between said ears being sufficient to allow limited fore and aft movement of said spring relative to said axle.

22. In a suspension assembly for a vehicle having a chassis and an axle, at least one leaf spring in a load bearing relationship between the chassis and axle, means flexibly mounting both ends of said leaf spring at least one of said ends being mounted to said chassis, said mounting means having means allowing longitudinal flexing of the leaf spring about each mounting means in response to changes in the load bearing relation of the chassis to the axle.

23. A vehicle suspension assembly for a vehicle having a chassis and front and rear axles comprising a shackle assembly, a front leaf spring supported at one end by the chassis and at the other end by the shackle assembly, a rear leaf spring supported at one end by the shackle assembly and at the other end by the rear axle, the front leaf spring having a portion between its ends bearing downwardly against the front axle, the rear leaf spring having a portion between its ends bearing upwardly against the chassis, and an elastomeric spacer mounting at least one end of the front leaf spring or the front end of the rear leaf spring to its support, means mounting said at least one end to one side of said spacer, and means mounting the support for said at least one end to the other side of said spacer, said spacer providing both compressive resilience and resilient flexing in the fore and aft directions in response to loading and unloading of the suspension assembly.

24. The vehicle suspension of claim 23 wherein said elastomeric spacer mounts the one end of the front leaf spring to its support, and an elastomeric spacer mounts the other end of the front leaf spring and the front end of the rear leaf spring to the shackle assembly.

25. The vehicle suspension of claim 23 further comprising rods pivotally supported at one end to the chassis and pivotally supported at the other end to the axles.

* * * * *